(12) United States Patent
Schawag et al.

(10) Patent No.: US 10,024,194 B2
(45) Date of Patent: Jul. 17, 2018

(54) DIVERTER DAMPER

(75) Inventors: Wolfgang Schawag, Dinslaken (DE);
Arthur Joseph Hendrikus Franciscus Knoors, Buchten (NL); Frank Willems, Stolberg (DE)

(73) Assignee: GLOBAL POWER NETHERLANDS B.V., Heerlen (NL)

( * ) Notice: Subject to any disclaimer, the term of this patent is extended or adjusted under 35 U.S.C. 154(b) by 605 days.

(21) Appl. No.: 14/232,157

(22) PCT Filed: Jul. 12, 2012

(86) PCT No.: PCT/NL2012/050496
§ 371 (c)(1),
(2), (4) Date: Feb. 25, 2014

(87) PCT Pub. No.: WO2013/009177
PCT Pub. Date: Jan. 17, 2013

(65) Prior Publication Data
US 2014/0150399 A1      Jun. 5, 2014

(30) Foreign Application Priority Data
Jul. 13, 2011   (NL) ..................................... 2007102

(51) Int. Cl.
*F01D 25/30* (2006.01)
*F16K 31/52* (2006.01)
(Continued)

(52) U.S. Cl.
CPC .............. *F01D 25/30* (2013.01); *B23P 11/00* (2013.01); *F02C 7/08* (2013.01); *F16K 11/052* (2013.01);
(Continued)

(58) Field of Classification Search
CPC .... F01D 25/30; F02C 6/08; F02C 9/18; F05D 2260/96; F05D 2260/962; F16K 11/052;
(Continued)

(56) References Cited

U.S. PATENT DOCUMENTS 1,923,773 A * 8/1933 Carpenter ............... F27D 3/026
198/780
2,251,822 A * 8/1941 Carlson ................... F23L 13/02
126/293
(Continued)

FOREIGN PATENT DOCUMENTS

EP   0707176    4/1996
EP   1978304   10/2008
(Continued)

OTHER PUBLICATIONS

Int'l Search Report issued in App. No. PCT/NL2012/050496 (2012).

*Primary Examiner* — Matthew P Travers
(74) *Attorney, Agent, or Firm* — Barnes & Thornburg LLP; Mark J. Nahnsen

(57) ABSTRACT

A diverter damper for controlling a gas flow in a gas duct of large cross section. The diverter damper includes a housing having an inlet and two outlets, a pivotable flap which in a first extreme position closes a first outlet and in a second extreme position closes a second outlet. The damper further includes a drive shaft connected to the pivotable flap, wherein the drive shaft extends at least partly between two opposite housing walls and through at least one of the two opposite housing walls, and at least one actuator mechanism that is located outside the housing near or against the at least one housing wall through which the drive shaft extends. The actuator mechanism includes at least one cylinder piston unit connected to the drive shaft for pivoting the flap into one of
(Continued)

Figure 1:
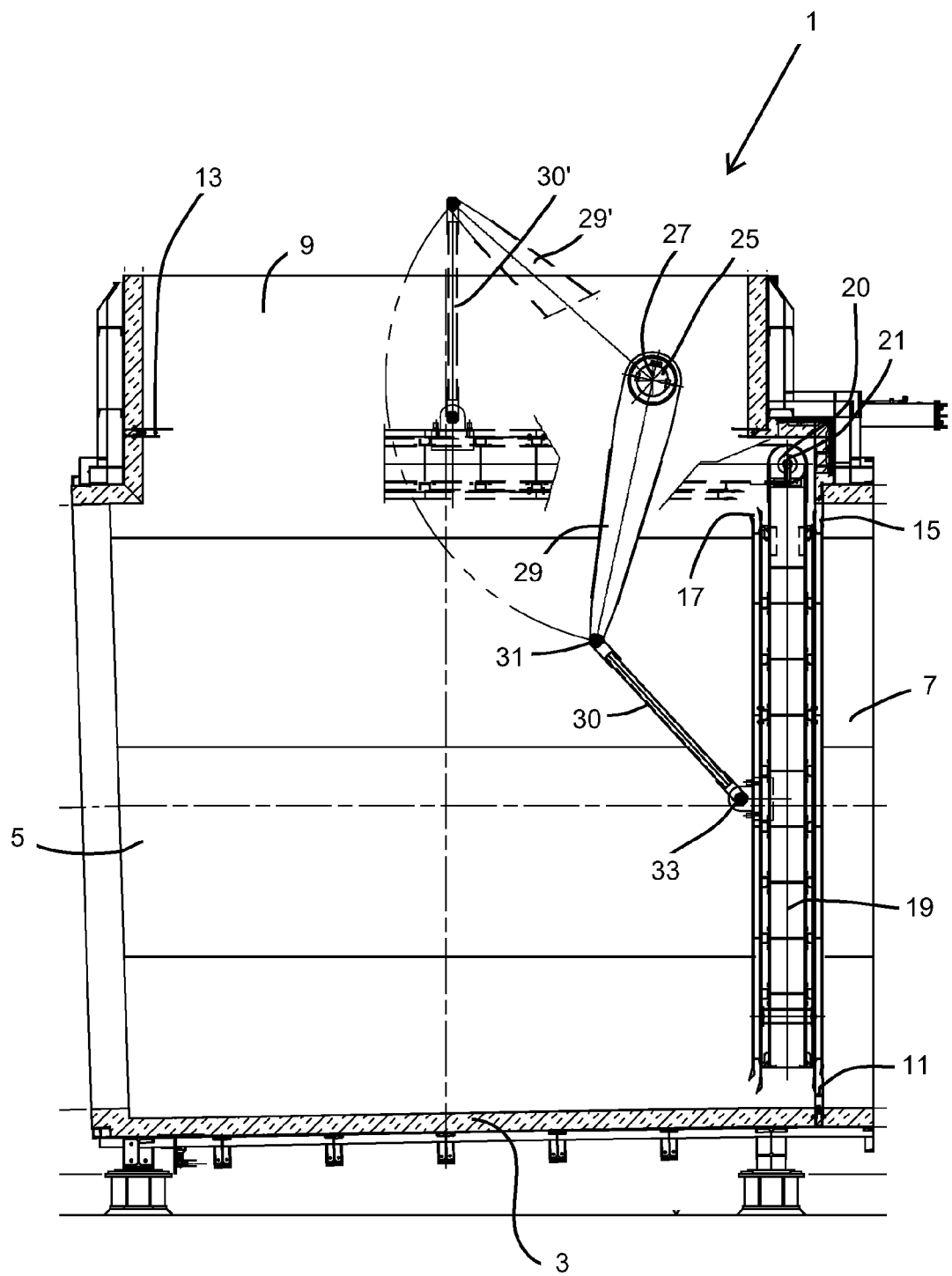

the extreme positions or into a position between the extreme positions.

11/00; F23L 13/02; Y10T 137/87788; Y10T 137/87812

See application file for complete search history.

13 Claims, 3 Drawing Sheets

(56) References Cited

U.S. PATENT DOCUMENTS

| | | | |
|---|---|---|---|
| 4,027,654 A | 6/1977 | Kannapell | |
| 4,821,507 A | 4/1989 | Bachmann et al. | |
| 5,697,596 A | 12/1997 | Kremers et al. | |
| 8,091,858 B2 | 1/2012 | Janich et al. | |
| 2005/0166981 A1* | 8/2005 | Brotzman | F16K 31/047 137/872 |
| 2010/0288957 A1 | 11/2010 | Janich | |

(51) Int. Cl.
 *B23P 11/00* (2006.01)
 *F16K 11/052* (2006.01)
 *F23L 11/00* (2006.01)
 *F02C 7/08* (2006.01)

(52) U.S. Cl.
 CPC .............. *F16K 31/52* (2013.01); *F23L 11/00* (2013.01); *Y10T 29/49323* (2015.01)

(58) Field of Classification Search
 CPC ....... F16K 11/072–11/074; F16K 31/52; F23L

FOREIGN PATENT DOCUMENTS

| EP | 2251603 | 11/2010 |
|---|---|---|
| GB | 1547921 | 7/1979 |

* cited by examiner

DIVERTER DAMPER

CROSS REFERENCE TO RELATED APPLICATIONS

This application is a U.S. nationalization under 35 U.S.C. § 371 of International Application No. PCT/NL2012/050496, filed Jul. 11, 2012, which claims priority to Netherlands Patent Application No. 2007102, filed Jul. 13, 2011. The disclosures set forth in the referenced applications are incorporated herein by reference in their entireties.

The invention relates to a diverter damper.

Diverter dampers can be used in gas turbine systems and in similar systems having ducts with a relatively large cross section, i.e. larger than 5 square meters. A frame of a diverter damper represents a housing having a large piece of ducting with a branch in it. By means of a pivotally flap the flow of gas is diverted to a ducting outlet or to a branch outlet or to both if the flap extends between these extreme positions. Said flap is driven by a actuation mechanism located mainly or completely outside the housing of the diverter damper. The flap is in its extreme positions located out of the gas stream. The flap itself is built up to give stiffness for tight sealing and flutter resistance. Hinging of the flap is normally arranged at the duct top and at the aperture edge farthest from the source of hot gas. This mounting allows upstream pressure to help seat the flap tightly. Diversion of gas-turbine exhaust is not the only application for the damper. In a straight duct, it can act as a bypass damper, as for example in a flue gas desulfurisation work.

The actuation mechanism comprises at least one cylinder piston unit which is connected to the hinging. The hinging comprises a drive shaft which is located partly inside the housing and partly outside the housing. In a known toggle type diverter damper, the drive shaft part located inside the housing is by means of levers connected in a known elbow construction to the flap.

A known drive shaft comprises a relatively thin walled actuator pipe of which at least one end part thereof is welded to a hub carrying the levers inside the housing. More common both spaced apart end parts are welded to a hub carrying the levers inside the housing. The hub is connected for example by means of shaft keys to a largely massive shaft. Said shaft extends from inside the housing to the outside of the housing. Outside the housing said shaft is connected to the actuator mechanism located at opposite walls of the housing.

A problem of the known drive shaft is that the construction thereof is rather complex. Further, a number of measures have to be taken in the actuation mechanism to compensate the thermal stress experienced in the drive shaft.

It is therefore an object of the present invention to provide a diverter damper comprising a drive shaft that is less complex and less sensitive to thermal stress.

This object is achieved by means of a diverter damper as is specified in claim 1.

The drive shaft in the diverter damper according to the present invention comprises at least one hollow actuator pipe end part, said actuator pipe end part extends through the at least one housing wall such that said pipe end part is located both inside the housing where said end part is connected to the flap and outside the housing where each end part is connected to the at least one cylinder piston unit.

By eliminating the largely massive shaft of the known drive shaft a considerable weight reduction can be reached. This massive shaft is normally made of forged steel and its manufacture consumes a lot of energy resulting in an relatively major environmental impact. For example, with a diverter damper having a hollow actuator pipe comprising at least one of the above mentioned end parts and having a total length of approximately 9 meters (9000 mm) and a diameter of 500 mm, a total weight reduction of approximately 4000 kg. can be achieved. Depending on the dimensions of the flap and correspondingly the cross sections of the ducts to be closed by means of the flap, it is possible for relatively small diverter dampers, for ducts with cross sections between 5-15 square meters, that only one of the end parts is configures as specified above. However, for evenly distributing the forces for pivoting the flap during use it is more common for ducts with cross sections starting from 10 square meters that these diverter dampers comprise two spaced apart, substantially identically dimensioned and substantially identically hollow actuator pipe end parts having a common virtual centre axis, said actuator pipe end parts extending through the two opposite housing walls such that each end part is located both inside the housing where each end part is connected to one of the levers and outside the housing where each end part is connected to the at least one cylinder piston unit.

Further, the manufacturing of hollow pipe end parts is less complex than the conventional drive shaft, resulting in lower costs and less long delivery times. Further, the manufacture hollow pipe end parts does not consume a lot of energy resulting in an relatively minor environmental impact. A main advantage of the drive shaft according to the present invention is that is less sensitive to thermal stress as each hollow actuator pipe end part is made from one material, has a constant cylindrical pipe-like shape and a constant material thickness. In use for example in a gas turbine the delta temperature in time inside the housing of the diverter damper is very high. In a couple of minutes temperature rises inside the housing of the diverter damper from ambient temperature to 700 degrees or more. Due to the use of one material only, a constant cylindrical pipe-like shape and a constant material thickness the main components of the drive shaft, i.e. the two spaced apart, hollow actuator pipe end parts, will be heated up in a constant manner and will have a constant expanding behaviour and therefore the thermal stress will be handled in a controllable manner. This has the advantage that the maintenance of the drive shaft can be reduced drastically, as the problem of the known drive shaft involving welding cracks between the hub and the actuator pipe due to thermal stress does not longer need to be inspected.

In an advantageous embodiment the end parts of the actuator pipe are connected with each other by means of at least one middle actuator pipe section such that a single hollow actuator pipe with a substantially uniform diameter and uniform wall thickness is provided. The actuator pipe end parts can be welded to the hollow middle section having to same wall thickness and diameter. However, it is also possible that the actuator pipe end parts are in one-piece with the middle actuator pipe section. How the actuator pipe is build will depend from the total length of the drive shaft, as the range of the length of the drive shaft will vary between 3-15 meters. The middle actuator pipe section will mainly provide mechanical strength to the drive shaft and as there are no differences in material or in material thickness between the pipe end parts and the middle section or middle sections the thermal stress behaviour will be predictable and controllable.

In another embodiment outside the housing each end part of the actuator pipe comprises connection flanges for providing a connection between the actuator pipe and the at least one cylinder piston unit, which connection flanges are in one-piece with the actuator pipe. The angle between the end part and one of the connection flanges is approximately 90 degrees.

As the actuator pipe and the connection flanges are formed in one-piece a strong connection is provided for transferring the forces for pivoting the flap from the cylinder piston unit to the actuator pipe. Further, the one-piece construction does not use any shaft keys and bearings such that a relatively simple and cost effective construction is provided.

In a further embodiment the actuator mechanism comprises a first frame and a second frame, wherein the second frame comprises two second frame parts between which the first frame is located. The first frame is composed of the connection flanges, which first frame is pivotally mounted directly to at least one piston rod of the cylinder piston unit for rotating the end part of the actuator pipe. Such a direct mounting of the piston rod with the first frame in a pivotally manner provides a robust and low maintenance mechanism for rotating the actuator pipe.

In yet another embodiment said each second frame parts is connected by means of one sleeve bearings to the end part of the actuator pipe. Preferably, these sleeve bearings are the only bearings of actuator mechanism with the actuator pipe. On the drive shaft these sleeve bearing are arranged symmetrically, i.e. two sleeve bearings on each side of the housing of the diverter damper. The sleeve bearings further make it possible that the actuator pipe can expand in its longitudinal direction. Especially, during warming up of the damper diverter the thermal stress will provide such a longitudinal expanding of the actuator pipe. As the actuator pipe is allowed to expand in a controllable manner in its longitudinal direction by means of the sleeve bearings the conventional thermal stress problems are no longer present in the drive shaft of the diverter damper according to the invention.

Further, the two second frame parts are connected to a cylinder barrel of the cylinder piston unit, which cylinder barrels are supported pivotally about a pivot axis by means of at least one external support. In such an embodiment the actuator pipe and the actuator mechanism are integrated components and therefore additional bearings, besides the sleeve bearings, can be omitted providing a cost effective diverter damper. Further, by means of the external pivotally support a relatively small pivotally movement is permitted such that the actuator mechanism is able to follow the actuator pipe, if necessary.

In a further embodiment each actuator pipe end part located inside the housing is provided with connection means to be connected to one of the levers, which connection means are formed in one-piece with the actuator pipe end part. Preferably, the lever is formed in one piece with the actuator pipe end part. This also provides a robust an low maintenance construction inside the housing of the diverter damper.

The invention further relates to a method for installation of a diverter damper as described above. The object of this installation method is to reduce manufacturing time. This object will be reached by the method as specified in claim 10. With this method the housing of the diverter damper can be build on the building site, whereas the actuator pipe and actuator mechanism can be prefabricated and positioned on the building site to the rest of the diverter damper. This installation method reduces installation time up to 20% and reduces the energy consumption for manufacturing the diverter damper drastically.

Figure 2:
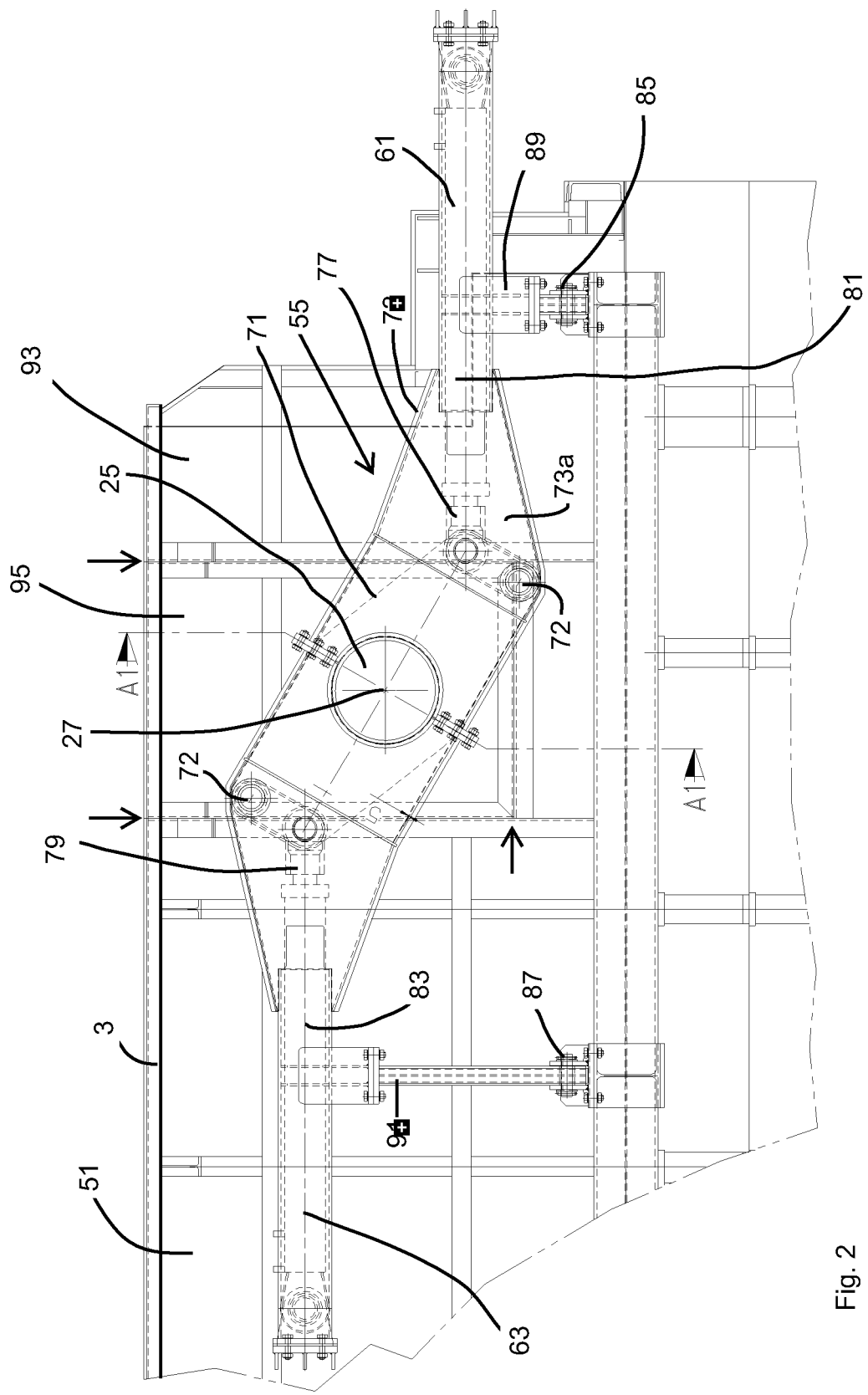
Figure 3:
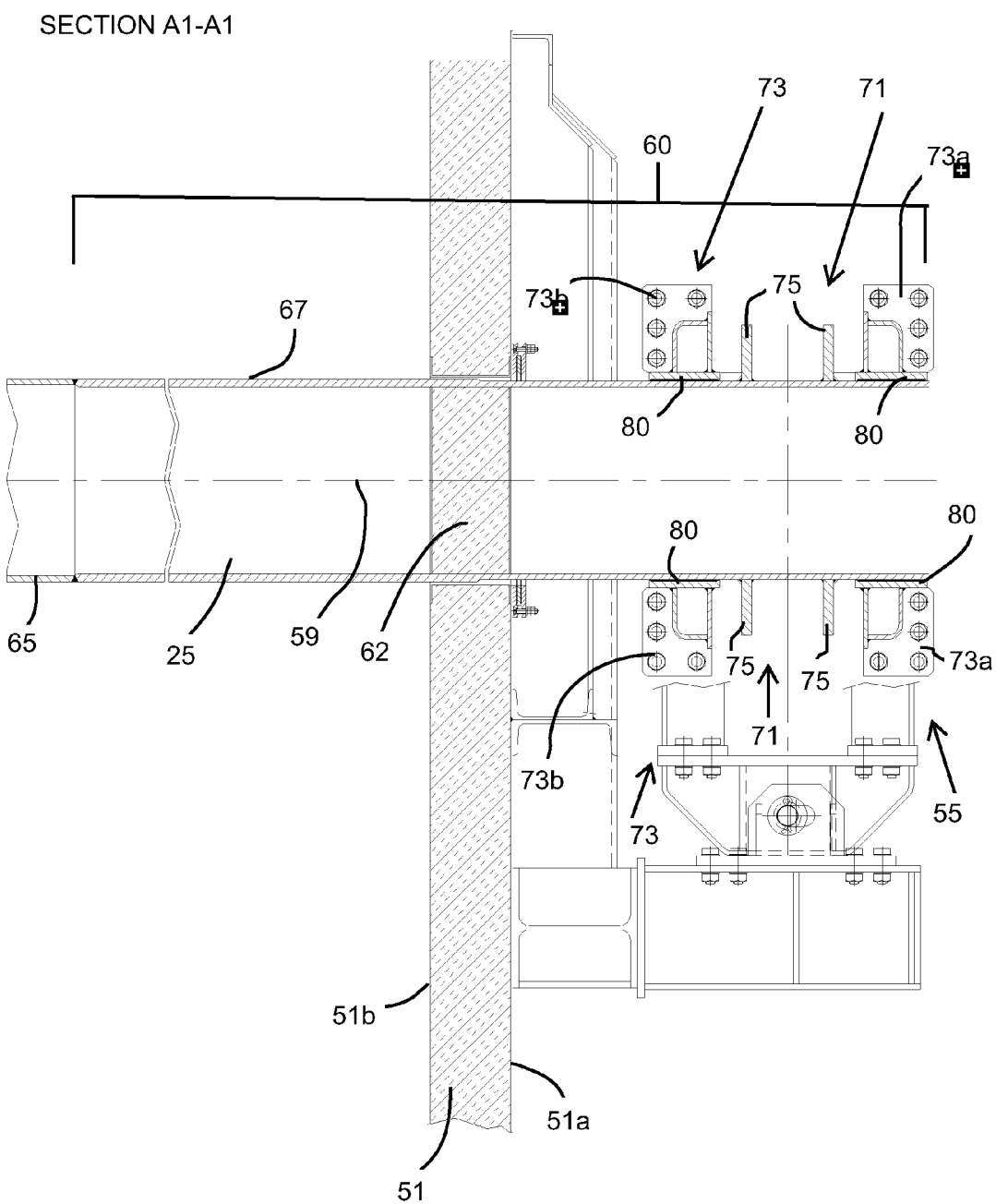

The invention will now be explained in more detail with reference to an exemplary embodiment shown in the appended figures, in which:

FIG. 1 shows a schematic cross section of a diverter damper according to the invention, FIG. 2 shows a side view of a part of a diverter damper according to the invention shown in FIG. 1, FIG. 3 shows a cross section A1-A1 as identified in FIG. 2, of a actuator pipe end part of a diverter damper according to the invention.

Like parts are indicated by the same numerals in the various figures.

A diverter damper 1 shown in FIG. 1 includes a housing 3 having three conductor connections, i.e. an inlet 5 and two outlets 7, 9. FIG. 1 shows mainly features of a diverter damper according to the invention inside housing 3. These inlet 5 and outlets 7, 9 are in a build-up stage connected to gas ducts (not shown). It is also possible that in use one of the outlets 7, 9 will function as an inlet, such that inlet 5 will become an outlet. Outlets 7, 9 are provided with sealing means 11, 13 respectively. A flap 19 with respective sealing members 15, 17 is mounted in housing 3 for reciprocal pivoting movement through an angle of approximately 90 degrees about a shaft 20 defining a first pivot axis 21. Thus, flap 19 is pivotable around the first pivot axis 21 to a first extreme position in which first position flap 19 closes a first outlet 7 as shown by solid lines in FIG. 1 and from the first position the flap 19 is pivotable to a second extreme position closing the second outlet 9, partly shown in dashed lines in FIG. 1. In the extreme positions of the flap an outlet 7, 9 is blocked by means of the flap 19, sealing means 11, 13 and sealing members 15, 17.

Flap 19 is moved between the extreme positions thereof by a drive shaft 25 defining an axis 27 by pivotable levers 29, 30 fixed to drive shaft 25. Levers 29, 30 are pivotable around a second and third pivot axes 31, 33. Rotation of drive shaft 25 in opposite directions about axis 27 will move lever 29 through an angle of rotation sufficient to cause lever 30 to move flap 19 between the two extreme positions thereof. In FIG. 1 the extreme positions are shown with solid lines and partly with dashed lines, see for example dashed levers which are indicated in FIG. 1 with an accent, see FIG. 1 levers 29' and 30'. This configuration of levers 29, 30 connected to drive shaft 25 and flap 19 is known in the prior art and this configuration of levers is indicated as an elbow configuration of a diverter damper 1 of the toggle type. As this configuration is known by a person skilled in the art details of how this elbow configuration operates will be omitted in this description.

In FIG. 2 a section of a housing wall 51 of housing 3 is shown, more in particular the outside of housing wall 51 is shown. Further, there is illustrated in FIG. 2 an actuator mechanism 55, located outside the housing 3, for reciprocal rotation of drive shaft 25 about axis 27 to achieve movement of flap member 19 between the two extreme positions thereof. A housing wall (not shown) opposite to housing wall 51 comprises also an actuator mechanism (not shown), which is identical to the actuator mechanism 55 shown in FIG. 2. In FIG. 3 a schematic cross section is shown across dashed line A1-A1 shown in FIG. 2. FIG. 3 shows drive shaft 25, part of the actuator mechanism 55 located outside the housing on a side facing the outside 51a of housing wall 51, and a part of drive shaft 25 located inside the housing facing the inside 51b of housing wall 51a, which part is connected (not shown in FIG. 3) to lever 29.

The drive shaft 25 according to the present invention comprises two spaced apart, substantially identically dimensioned and substantially identically hollow actuator pipe end parts having a common virtual center axis 59 indicated with dashed line in FIG. 3. One of these actuator pipe end parts 60 is indicated in FIG. 3. Said actuator pipe end part 60 extends through the housing wall 51 such that the end part 60 is located both inside the housing 3 where each end part 60 is connected to one of the levers 27 and outside the housing 3 where each end part 60 is connected to the two cylinder piston units 61, 63. The other identical actuator pipe end part (not shown) extends through the opposite housing wall (not shown) of the diverter damper 1. The end parts of the actuator pipe 60 are connected with each other by means of at least one middle actuator pipe section 65 such that a single hollow actuator pipe 67 with a substantially uniform diameter and uniform wall thickness over its total longitudinal length is provided.

Each actuator mechanism 51 comprises a hydraulic cylinder system with two cylinder piston units 61, 63, which two cylinder piston units 61, 63 are connected to the said drive shaft 25 for pivoting the flap 19 into one of the extreme positions or into a position between the extreme positions. The actuator mechanism comprises further a first frame 71 indicated in dashed lines in FIG. 3 and a second frame 73, wherein the second frame 73 comprises two second frame parts 73*a,b* between which the first frame 71 is located.

The first frame 71 is composed of connection flanges 75, also known for a person skilled in the art as "lever arms", which connection flanges 75 are in one-piece with the actuator pipe end parts 60 and the angle between the end part 60 and the connection flanges 75 is approximately 90 degrees. By means of the connection flanges 75, the first frame is pivotally mounted directly to a piston rod 77, 79 of the cylinder piston unit 61, 63 for rotating the end part 60 of the actuator pipe. Further, locking openings 72 are shown for locking the flap 19 in one of the extreme positions by means of a bar (not shown) during for example maintenance of the diverter damper 1.

Each second frame part 73*a, b* is connected by means of one sleeve bearing 80 to the end part 60 of the actuator pipe 67. The two second frame parts 73*a, b* are connected to a cylinder barrel 81, 83 of the cylinder piston unit 61, 63, which cylinder barrels 81, 83 are supported pivotally about pivot axes 85, 87 by means of at least one external support 89, 91.

In use for example in a gas turbine the delta temperature in time inside the housing 3 of the diverter damper 1 is very high. In a couple of minutes temperature rises inside the housing 3 of the diverter damper 1 from ambient temperature to 700 degrees or more. The drive shaft 25 is designed as an actuator pipe manufactured from only one material, having a constant cylindrical pipe-like shape and a constant material thickness. Due to these features of the actuator pipe, it will be heated up in a constant manner and will have a constant expanding behavior mainly in the longitudinal direction of the actuator pipe 67. In this way the thermal stress will be handled in a controllable manner. The longitudinal expanding of the actuator pipe 67 is compensated by means of the sleeve bearings 80 and/or by means of the cylinder piston unit 61, 63 pivotable about pivot axes 85, 87 by means of the external supports 89, 91. Therefore, the conventional thermal stress problems are no longer present in the drive shaft of the diverter damper 1 according to the present invention.

Inside the housing each actuator pipe end part 60 is provided with connection means (not shown) to be connected to the lever 29, which connection means are preferably formed in one-piece with the actuator pipe end part 60.

It is also possible that the lever 29 is formed in one piece with the actuator pipe end part 60.

Further, the at least one hollow pipe end part is provided at least partly with an insulation 62 located inside the hollow pipe end part 60. The insulation 62 has a cylindrical shape having a diameter corresponding approximately to the inner diameter of the hollow pipe end part 60 for in use blocking heat from the part of the hollow pipe end part located inside the housing to the part of the hollow pipe end part located outside the housing. The insulation 62 is preferably positioned near the housing wall 51 and preferably has a length in the longitudinal direction of the drive shaft 25 corresponding to the thickness of the housing wall 51.

The housing 3 comprises as is explained above the housing wall 51. In a preferred embodiment, see FIG. 2, the housing wall 51 comprises a larger wall part 93 and a smaller wall part 95 through which smaller wall part 95 the actuator pipe end parts 60 extend. The opposite housing wall 51 also has this smaller wall part (not shown) and larger wall part (not shown). The smaller wall part 95 is indicated by a combination of two dashed lines and one solid line (indicated by arrows in FIG. 3). The smaller wall part 95 is preferably connectable by welding to the larger wall part 93. In this way it is possible to prefabricate the smaller wall part 95 comprising the actuator mechanism 55 and actuator pipe 25 as a whole. Connecting this smaller part with the actuator mechanism 55 and actuator pipe 25 to the larger part can be done on site for positioning the actuator mechanism 55 and actuator pipe 25 in the diverter damper 1. This installation method reduces installation time up to 20%.

In the drawings use of two hollow pipe end parts has been shown. It is however possible according to the invention to use only one hollow pipe end part. It is for example possible that the other end part of the drive shaft 25 does not extend through the opposite housing wall, but this other end part of the drive shaft 25 is bearing mounted to the inside of this housing wall.

Although a toggle type diverter damper 1 is shown in the figures, it is also possible to use the hollow pipe end parts in a pivot type diverter damper (not shown).

In addition, although two cylinder piston units 61, 63 are used in the preferred embodiment on each side of the housing for performing a pivoting movement of the flap, it is also possible to use only one cylinder piston unit on each side. In case of the above indicated drive shaft having only one end part according to the invention and the other end part of the drive shaft bearing mounted to the inside of this housing wall, the diverter damper may use only one cylinder piston unit for rotating the flap.

The invention claimed is:

1. A diverter damper for controlling a gas flow in a gas duct of large cross section, said diverter damper comprising:
   a housing having an inlet and first and second outlets,
   a pivotable flap which in a first extreme position closes the first outlet and in a second extreme position closes the second outlet,
   a drive shaft connected to the pivotable flap, wherein the drive shaft extends through two opposite housing walls of the housing and is rotatable about an axis,
   at least one actuator mechanism that is located outside the housing near or against one of the two housing walls through which the drive shaft extends, wherein said actuator mechanism comprises two cylinder piston units connected to said drive shaft for pivoting the flap into one of the extreme positions or into a position between the extreme positions, wherein said drive shaft comprises two hollow actuator pipe end parts, each actuator pipe end part extends through a respective one of the housing walls such that said actuator pipe end parts are located both inside the housing where said actuator pipe end parts are connected to the flap and outside the housing, wherein outside the housing at least one of the actuator pipe end parts comprise connection flanges for providing a connection between the actuator pipe end part and a first end of each of the two cylinder piston units, which connection flanges are in one-piece with the actuator pipe end part, wherein the connection flanges are provided on opposite sides of the actuator pipe end part and a frame, wherein the frame comprises two frame parts that are axially spaced from the connection flanges and wherein the frame is movable with respect to the housing and the connection flanges are movable with respect to the frame.

2. A diverter damper according to claim 1, wherein the actuator pipe end parts are substantially identically dimensioned and substantially identically hollow having a common virtual center axis.

3. A diverter damper according to claim 2, wherein the end parts of the actuator pipe are connected with each other by means of at least one middle actuator pipe section such that a single hollow actuator pipe with a substantially uniform diameter and uniform wall thickness is provided.

4. A diverter damper according to claim 1, wherein the actuator pipe end part inside the housing is connected to the flap by means of levers configured in an elbow construction.

5. A diverter damper according to claim 4, wherein each actuator pipe end part inside the housing is provided with a connector to connect the actuator end parts to one of the levers, wherein the connectors are formed in one-piece with the actuator pipe end part.

6. A diverter damper according to claim 4, wherein one of the levers is formed in one piece with the actuator pipe end part.

7. A diverter damper according to claim 1, wherein the flanges are pivotally mounted to the cylinder piston units for rotating the actuator pipe end parts.

8. A diverter damper according to claim 1, wherein each frame part is connected by a sleeve bearing to one of the actuator pipe end parts.

9. A diverter damper according to claim 1, wherein the two frame parts are connected to a cylinder barrel of the cylinder piston unit, which cylinder barrel is supported pivotally about a pivot axis by means of at least one external support.

10. A diverter damper according to claim 1, wherein the at least one hollow actuator pipe end part is provided at least partly with insulation located inside the hollow pipe end part.

11. A diverter damper according to claim 10, wherein the insulation has a shape having a diameter corresponding approximately to the inner diameter of the hollow pipe end part for in use blocking heat from the part of the hollow pipe end part located inside the housing to the part of the hollow pipe end part located outside the housing.

12. A diverter damper according to claim 1, wherein at least one of the housing walls through which said actuator pipe end parts extend comprises a smaller wall part which is manufactured as one whole with the drive shaft, which smaller wall part is connected on a building site to a larger wall of the at least one housing wall part.

13. A method for building the diverter damper according to claim 1, wherein at least one of the opposite housing walls comprises a smaller wall part, through which smaller wall part the actuator pipe end part extends, wherein the method comprises the step of welding each smaller wall part to a larger wall part of said housing wall for positioning the actuator mechanism including the actuator pipe end parts on a building site.

* * * * *

UNITED STATES PATENT AND TRADEMARK OFFICE
CERTIFICATE OF CORRECTION

| | | |
|---|---|---|
| PATENT NO. | : 10,024,194 B2 | Page 1 of 1 |
| APPLICATION NO. | : 14/232157 | |
| DATED | : July 17, 2018 | |
| INVENTOR(S) | : Wolfgang Schawag et al. | |

It is certified that error appears in the above-identified patent and that said Letters Patent is hereby corrected as shown below:

On the Title Page

Column 1, under Item (22), the PCT filing date should read as follows:
--Jul. 11, 2012--

Signed and Sealed this
Second Day of July, 2019

Andrei Iancu
*Director of the United States Patent and Trademark Office*